United States Patent [19] [11] Patent Number: 4,744,264
Milenkovic [45] Date of Patent: May 17, 1988

[54] HOLLOW NON-SINGULAR ROBOT WRIST

[75] Inventor: Veljko Milenkovic, Birmingham, Mich.

[73] Assignee: Ford Motor Company, Dearborn, Mich.

[21] Appl. No.: 934,526

[22] Filed: Nov. 24, 1986

Related U.S. Application Data

[63] Continuation-in-part of Ser. No. 752,753, Jul. 8, 1985.

[30] Foreign Application Priority Data

Jun. 30, 1986 [EP] European Pat. Off. ........ 86305077.9

[51] Int. Cl.$^4$ .................. G05G 11/00; B25J 17/02
[52] U.S. Cl. .................................. 74/479; 464/117; 901/28; 901/29
[58] Field of Search .............. 74/469, 479; 464/117; 901/28, 29

[56] References Cited

U.S. PATENT DOCUMENTS

| 3,580,099 | 5/1971 | Mosher | 74/469 |
| 4,107,948 | 8/1978 | Molaug | 464/148 X |
| 4,300,362 | 11/1981 | Lande et al. | 901/28 X |
| 4,353,677 | 10/1982 | Susnjara et al. | 414/735 |
| 4,365,928 | 12/1982 | Baily | 414/735 |
| 4,568,311 | 2/1986 | Miyake | 464/109 |

FOREIGN PATENT DOCUMENTS

| 3036116 | 5/1982 | Fed. Rep. of Germany | 901/29 |
| 2100226 | 12/1982 | United Kingdom | 414/730 |
| 738863 | 6/1980 | U.S.S.R. | 901/15 |

OTHER PUBLICATIONS

A New Pitch-Yaw-Roll Mechanical Robot Wrist Actuator, vol. 2, Society of Manufacturing Engineers, Jun. 2-6, 1985, Mark E. Rosheim, Proceedings of Robots 9 Conference.

Primary Examiner—Allan D. Herrmann
Attorney, Agent, or Firm—Frank G. McKenzie; Donald J. Harrington

[57] ABSTRACT

The end of a robot arm includes two links, a first or inner link supported rotatably about a central axis and an end link on which a tool is carried. Located between the links are a ring and a tube whose longitudinal axes are concentric. Each of four gimbal rings is used as a member of a universal joint that connects the links, the ring and the tube. The links are connected by two universal joints in series, and the ring connects these joints. The links are also connected by two other universal joints in series and the tube connects this second pair of joints. The first and second pairs of universal joints connected in series are connected to one another in parallel. Gimbal rings rotatably supported on the tube and on the links for angular movement about the yaw axis provide rotational support for the links and the connecting rod about the pitch axis. Actuating rods connected to the inner set of gimbal rings produce articulation of the wrist about these axis when the rods are actuated. Angular pitch displacement and angular yaw displacement are equalized between the inner set of gimbal rings and the outer set of gimbal rings by tension members.

19 Claims, 4 Drawing Sheets

HOLLOW NON-SINGULAR ROBOT WRIST

This is a continuation-in-part application of U.S. Ser. No. 752,753 filed on July 8, 1985.

BACKGROUND OF THE INVENTION

1. Field of the Invention

This invention relates to the field of industrial robots. More particularly, it pertains to a non-singular wrist assembly for a robot arm and especially to such a wrist assembly that provides for a fluid conduit to pass axially through the wrist.

2. Description of the Prior Art

Most wrist mechanisms used with industrial robot arms exhibit certain singular positions at which articulation becomes limited, i.e., where one degree of freedom is lost. Normally, the singularities occur well within the normal operating range of the wrist.

Increasingly, commercial robots are required to traverse a complicated three dimensional path at high speed and within a stringent accuracy tolerance. In these conditions, a robot having six degrees of freedom is needed to accomplish the desired motion. The motion of a tool carried by the robot arm forms a continuous path both in position and orientation. As wrist agility and dexterity increase, the smoothness of the path traversed by the tool and its coverage increase accordingly. Wrist agility is usually determined by its roll speed, i.e., the speed of rotation about the roll axis. Wrist dexterity is determined by the range of bend-back angle and the range of roll rotation. The manipulator for an industrial robot is generally moveable with respect to a reference base, such as a robot arm or boom, through a multiple axis articulated joint system by which the base and manipulator are connected. Power supplied to a component of the arm is transmitted through gearing to the manipulator, which grips a tool or another workpiece. Examples of systems which have employed bevel gear trains for this purpose are described in U.S. Pat. Nos. 4,353,677 and 4,365,928.

The robot arm on which the manipulator is attached can either be an inflexible structure having a wrist mechanism at its end, which can accommodate five or six degrees of freedom of the manipulator, or the robot arm itself may be flexible and comprise successive links hinged to each other by means of universal joints in order to produce the required translation and rotary movement of the manipulator. U.S. Pat. No. 4,107,948 describes a robot arm of this type. Another example of an articulating mechanism that produces large angular rotation of the manipulator with respect to the base using a multiple link connected in series along the arm is described in U.S. Pat. No. 3,580,099.

Also known in the prior art are mechanisms for transmitting axial motion applied to the base or inner end of the manipulator along the arm and converting that motion to articulation of the outer end of the manipulation arm. In the example described in U.S. Pat. No. 4,300,362, two rings spaced axially along the arm are linked by two connecting rods connected to the ring by joints having two degrees of freedom. To control the displacement of the outer ring relative to the inner ring, two control rods apply force through an elbow attached to the inner ring, the elbow having two degrees of freedom and being connected to linkds that extend transversely along the axis of the manipulating arm.

Complete control of tool orientation requires three rotational degrees of freedom; roll, i.e., rotation of the tool about its longitudinal centerline; pitch, rotation about a horizontal transverse centerline; and yaw, rotation about a vertical transverse centerline. In a conventional wrist mechanism known from the prior art, the first link is rotatably connected to the robot arm. The second link is rotatably connected to the first link, and the axis of the second rotation is usually perpendicular to the first axis. A third wrist link is rotatably connected to the second link, and the axis of the third rotation is usually perpendicular to the second link. The angle between the first and the third axes is not constant but varies in accordance with the angular displacement of the second axis. Singularity occurs when the first and third axes becomes parallel or coincident, a condition called "gimbal lock".

For example, if two shafts are connected by an ordinary universal joint such as a Hooke joint or Cardan joint, the shafts cannot rotate when the deflection angle of the joint becomes 90 degrees. Non-singular wrist mechanisms in the prior art avoid gimbal lock by providing additional rotary joints. The total angular deflection of the end link and tool is distributed over several joints, each joint articulating through substantially less than 90 degrees. By positive mechanical means, the deflection angle of consecutive joints are constrained to depend on each other so that the overall mechanism possesses no more than three degrees of freedom. Usually three or four universal joints in series are interposed between the first and the end wrist links. A disadvantage of such wrists is the large amount of backlash and the associated lack of precision and stiffness required to control within acceptable tolerance the orientation of the end link and tool.

SUMMARY OF THE INVENTION

In overcoming these and other disadvantages of the prior art, the industrial robot wrist mechanism according to this invention includes an end link to which a tool is attached and a first link connected to a robot arm. Located between these links are two concentric connecting members, a ring and a tube. Four gimbal rings arranged in pairs have a member of each pair rotatably connected to two of the other four wrist mechanism members. Each of the four gimbal rings functions as an intermediate member of the universal joint. A first joint comprises a first gimbal ring rotatably connected to the first link, whih permits yaw rotation about a vertical pivot axis, and to the ring, which permits pitch rotation about a horizontal pivot axis. The second joint comprises a second gimbal ring, concentric with the first gimbal ring, connected to the first link to permit pitch rotation and to the tube to permit yaw rotation.

The third and fourth universal joints are mutually concentric, located at the outer end of the ring, and articulate about a common center. The third joint includes a third gimbal ring, which is rotatably connected to the end link for yaw rotation, and to the ring for pitch rotation. The fourth joint comprises a fourth gimbal ring, which is rotatably mounted on the end link for pitch rotation, and on the tube for yaw rotation.

The first link and end links are, therefore, interconnected by two universal joints, the first and third joints being connected in series. The ring functions as an intermediate shaft in parallel with the first and third joints. The first link and end link are connected by two additionl universal joints in series. The second and fourth universal joints are connected by the tube.

As a result of this arrangement, the angular displacement in pitch, or yaw, or a combination of pitch and yaw, of the tube is the same as that of the ring because the first and second universal joints undergo identical angular displacements in magnitude and direction. Similarly, the deflection in the third universal joint is the same as that in the fourth joint.

Because of the equality of deflection in each of the four universal joints, the deflection angle between the centerline of the end link and the centerline of the robot arm is exactly twice as large as the angle between the centerline of the tube and the centerline of the robot arm. Furthermore, the sense of direction of the displacement between the centerline of the end link and the centerline of the robot arm is the same as the sense of direction of the angular displacements between the centerline of the tube and the centerline of the robot arm in pitch, yaw and any combination of pitch and yaw. Therefore, the axis of the robot arm, the axis connecting the centers of the gimbal rings, and the axis of the end link always lie in the same plane.

The industrial robot wrist mechanism of this invention articulates an end link to which a tool is attached that is free of singularity, accurate in its movement, free of excessive structural deflection and has minimum backlash.

With this arrangement, an end link with any tool attached to it can be given large deflections in pitch or yaw or a combination of pitch and yaw beyond 90° and as high as 100°, but the deflection of each universal joint is only one-half of that deflection displacement. Therefore, no singularity or gimbal lock results.

DESCRIPTION OF THE PREFERRED EMBODIMENT

Figure 1:
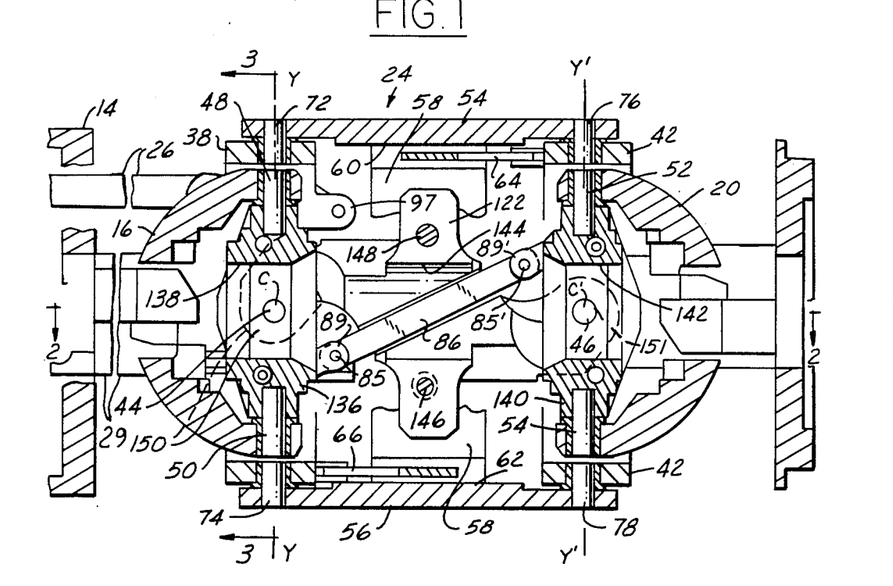
FIG. 1 is a vertical cross section of a non-singular wrist for an industrial robot according to the present invention taken at the vertical plane through the longitudinal axis.
Figure 2:
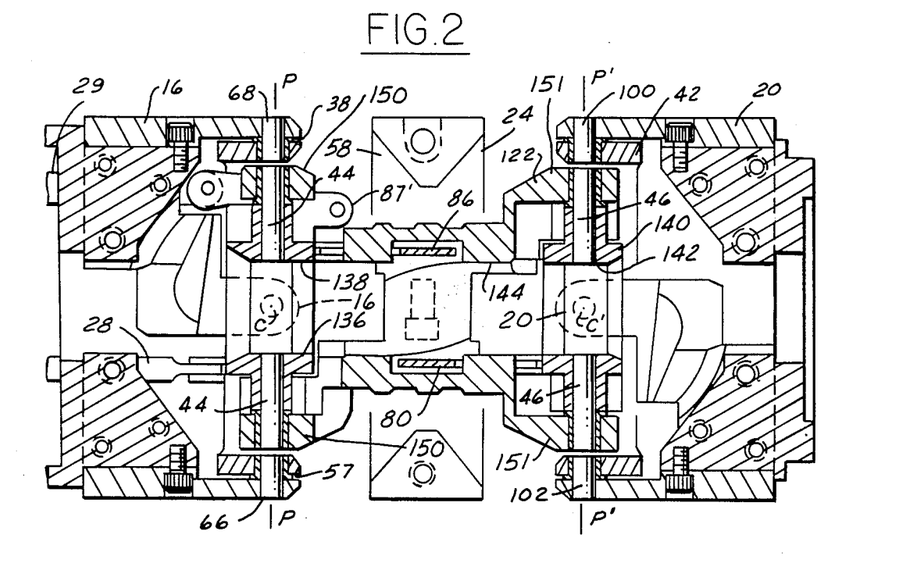
FIG. 2 is a cross section of the robot wrist of FIG. 1 taken at the horizontal plane through the longitudinal axis.
Figure 3:
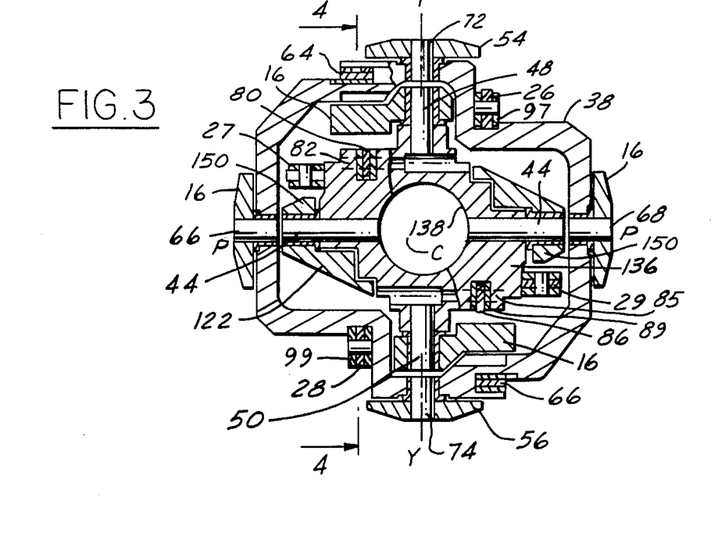
FIG. 3 is a cross section through a vertical plane passed through the inboard center taken at plane of FIG. 1 viewed inwardly toward the drive mechanism.

Referring first to FIGS. 1, 2 and 3, an industrial robot wrist mechanism is supported at the end of a robot arm 14 on bearings that permit rotation about the longitudinal axis. The mechanism includes a first link 16 rotatably supported on bearings seated within the arm 14; and end link 20 to which a tool or workpiece is attached for movement by the wrist mechanism; a connecting ring 122 rotatably supported at a first center or inboard pin connection and at a second center or outboard pin connection; and a connecting tube 24.

A first inner gimbal ring 136 is rotatably mounted on first link 16 for rotation about yaw axis Y—Y and provides support for the inner end of the connecting ring 122, which support permits ring 122 to pivot relative to gimbal ring 136 about pitch axis P—P. A second or outer gimbal ring 38 is rotatably mounted on the first link 16 for rotation about axis P—P and provides support for connecting tube 24 to pivot about the Y—Y axis. The Y—Y and P—P axes intersect at first center C, are mutually perpendicular, and are perpendicular also to the axis between centers C-C' when the components of the wrist are undeflected.

A third or inner gimbal ring 140 is pivotally mounted on end link 20 for rotation about the Y'—Y' axis, has its center located at C', and provides support for the outer end of connecting ring 122 for rotation about the P'—P' axis.

A fourth or outer gimbal ring 42 also has its center located at C', is rotatably supported on connecting tube 24 for rotation about the Y'—Y' axis, and rotatably supports end link 20 for rotation about the P'—P' axis.

Figure 5A:
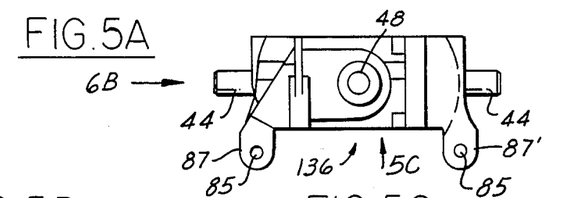
FIGS. 5A, 5B and 5C are top, side and front views of the first and third gimbal rings.
Figure 5B:
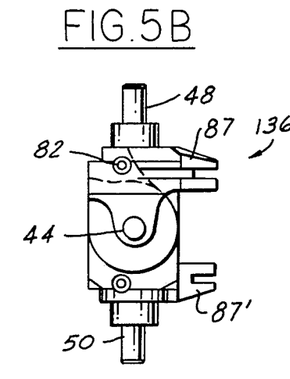
Figure 5C:
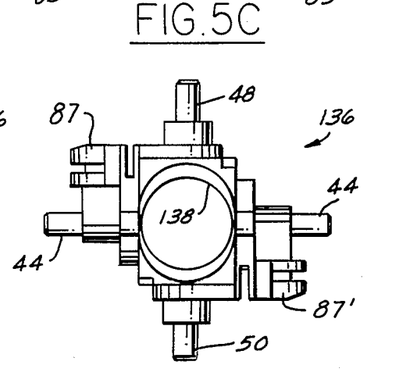
Figure 6A:
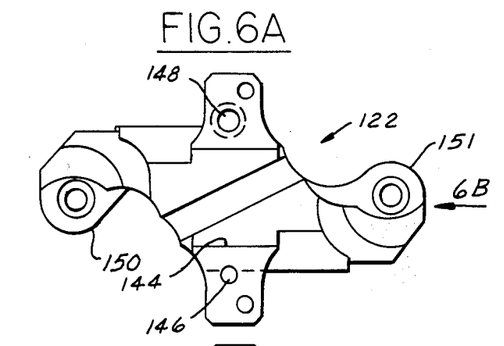
FIGS. 6A, 6B and 6C are side and end views of the connecting ring.
Figure 6B:
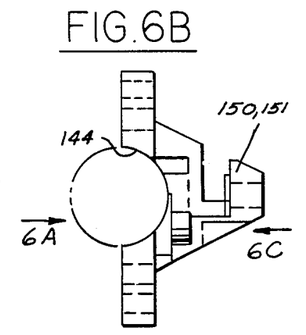
Figure 6C:
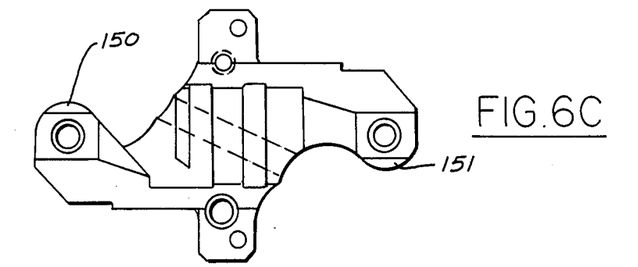

Referring also to FIGS. 5A, 5B and 5C, the first and third inner gimbal rings 136, 140 are each formed in one piece and have a central axially directed hole 138, 142 that is aligned with a central axially directed hole 144 formed in the members that comprise connecting ring 122. For ease of fabrication and assembly, the connecting ring is made of two pieces joined by screws and dowels 146, 148. To accommodate a conduit that may carry sealant, adhesive paint or other fluid from the robot arm to the end effector, the holes 138, 142 and 144 are coaxial when the wrist is undeflected.

First gimbal ring 136 is pivotally mounted on first link 16 by pins 48 and 50 for rotation about the Y—Y axis and is supported pivotally on connecting ring 122 by pins 44 for rotation about the P—P axis. Third gimbal ring 140 is pivotally mounted on the end link 20 by pins 52, 54 for rotation about the Y'—Y' axis, and on connecting ring 122 by pins 46 for rotation about the P'—P' axis.

The assembled connecting ring 122 has four projecting lugs, two of them 150 form a yoke within which gimbal ring 136 is pivotally supported on pins 44, and the other two 151 form a yoke on which gimbal ring 140 is pivotally supported.

Connecting tube 24 includes an upper plate 54, a lower plate 56, and semicircular bands 58 located at the axial midpoint of the wrist assembly by means of which the upper and lower plates 54, 56 are mechanically connected by bolted attachments 57. Bands 58 have oppositely directed diagonal slots 60, 62 on their upper and lower surfaces, respectively, in which yaw equalizing members 64, 66 are located. Member 64 is mechanically connected at its inboard end 65 to second gimbal ring 38 and at its outboard end to fourth gimbal ring 42. These connections are made on opposite sides of the longitudinal axis C-C', which connects the centers C and C'. The inboard and outboard ends of the upper and lower plates 54, 56 that form the connecting tube 24 are formed with holes adapted to carry pins 72, 74, 76, 78, as best seen in FIG. 1. These pins engages holes formed in the second and fourth gimbal rings 38, 42, respectively. The second gimbal ring is pivotally supported on the connecting tube by pins 72 and 74 for rotation about the Y—Y axis. The fourth gimbal ring 42 is pivotally supported on the connecting tube by pins 76, 78 for rotation about the Y'—Y' axis. Similarly, as best seen in FIG. 3, first link 16 is pivotally supported on the second gimbal ring 38 on pins 66, 68 for rotation about the P—P axis. At the opposite axial end of the wrist assembly, end link 20 is pivotally supported on the fourth gimbal ring 42 by pins 100, 102 for rotation about the P'—P' axis.

Pull rod 26 is mechanically connected to the upper surface of gimbal ring 38 and pull rod 28 is connected to the lower surface of gimbal ring 38 on the opposite side of the longitudinal axis from the location of the connection to pull rod 26. Yaw equalizing member 64 extends axially along the assembly and diagonally across the longitudinal axis, from the near side at center C to the far side at center C', and is connected at its inboard end to the second gimbal ring 38 as seen in FIG. 3, and at its outboard end to the fourth gimbal ring 42, as shown in FIG. 1. Member 64 transmits tension between gimbal rings 38 and 42. Similarly, yaw equalizing member 66 is attached at its inboard end to gimbal ring 38 and extends axially to a connection with gimbal ring 42, diagonally across the longitudinal axis from the far side inboard attachment at center C to the near side outboard attachment at center C'. Member 66 also transmits tension between these members to assure that gimbal rings 38 and 42 have the same angular rotation about the Y—Y and Y'—Y' axes.

Figure 4:
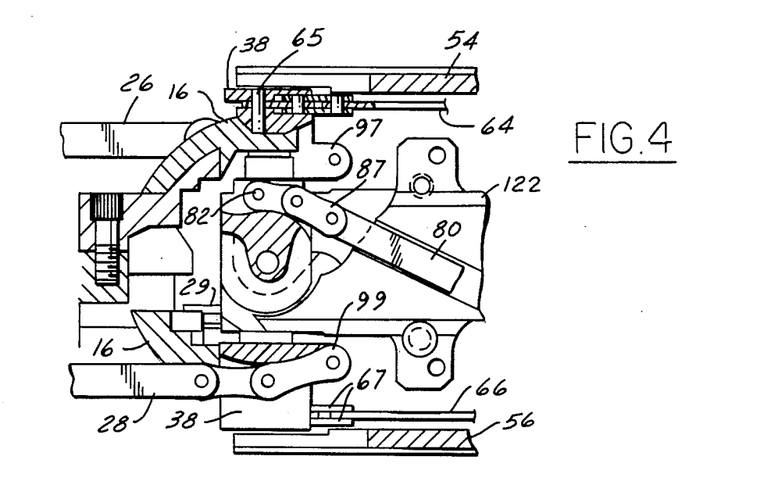
FIG. 4 is a cross section through a vertical plane at the inboard center taken at plane 4—4 of FIG. 3.

The mechanism for equalizing rotation of the first and third gimbal rings 136, 140 about the pitch axes P and P' is illustrated in FIGS. 1 and 4. Another mechanism is described in U.S. Ser. No. 752,753, filed July 8, 1982, entitled "Non-Singular Industrial Robot Wrist." The entire disclosure of U.S. Ser. No. 752,753 is herein incorporated by reference. One pitch equalization member 80 is connected by pin 82 to the inner vertical surface of gimbal ring 136 and is connected by a pin to an inner vertical surface of gimbal ring 140 on the opposite side of the pitch axis from the connection at pin 82. Pitch equalization member 80 is connected to gimbal ring 136 above axis P—P, and is connected to gimbal ring 140 below axis P'—P'. A second pitch equalization member 86 is connected to inner gimbal ring 136 below the P—P axis and extends axially from that attachment upward above the P'—P' axis to an attachment to inner gimbal ring 140. Pitch equalization members 80 and 86 transmit tension force between the inner gimbal rings and assure that the angular pitch of the gimbal rings is equal.

The non-singular robot wrist according to this invention is actuated for yaw and pitch displacement by applying tension selectively to the pitch pull rods 26, 28 and to the yaw pull rods 27, 29, as seen best in FIG. 3. When tension is applied to either pull rod 26 or 28, which are pinned to the second gimbal ring 38, rotation of that gimbal ring about the P—P axis results because of the pivotal connection of gimbal ring 38 on first link 16. Tension applied to pull rod 26 causes gimbal ring 38 to pitch upward; tension applied to pull rod 28 causes gimbal ring 38 to pitch downward. The motion is transmitted to center C', the center of the third and fourth gimbal rings, thereby producing corresponding pitch displacement of end link 20. Through operation of the pitch equalization mechanism, end link 20 is angularly displaced in the pitching sense of direction by twice the amount, and in the same direction, as the pitch displacement of longitudinal C-C' axis.

Similarly, yaw pull rods 27 and 29 are pinned to the first gimbal ring 136 on laterally opposite sides of the Y—Y axis. When tension is applied to pull rods 27, 29, rotation of gimbal ring 136 about the Y—Y axis results because of the pivotal connection of gimbal ring 136 on first link 16. When tension is applied to pull rod 27, angular yaw displacement to the right, when the wrist assembly is viewed from above, results. Tension applied to pull rod 29 causes angular yaw displacement to the left. The yaw equalization mechanism previously described causes end link 20 to rotate about the Y'—Y' axis at center C' by twice the amount, and in the same direction, as the angular yaw displacement of longitudinal axis C-C'.

First gimbal ring 136 is rotatably supported on first link 16 for yaw displacement about the Y—Y axis at center C; connecting ring 122 is rotatably supported on gimbal ring 136 so that ring 122 can pitch about axis P—P. Second gimbal ring 38 is rotatably supported on first link 16 for rotation about the P—P pitch axis and is joined to connecting tube 24 at a pin connection that permits relative rotation of tube 24 and ring 38 about the Y—Y axis. Third gimbal ring 140 rotatably supports connecting ring 122 for rotation about the P'—P' pitch axis at center C' and is rotatably mounted on end link 20 for rotation about the Y'—Y' axis. Fourth gimbal ring 42 is supported on end link 20 for rotation about the P—P pitch axis and is rotatably connected to the connecting tube 24 for rotation about the Y'—Y' axis.

Therefore, first link 16 and end link 20 are interconnected by two universal joints in series having their centers at C and C' and the connecting ring 122 maintains the relative positions of the centers of these two universal joints. In parallel with these universal joints, links 16 and 20 are interconnected by two additional universal joints in series, the joints comprising the components that are connected to gimbal rings 38 and 42. Connecting tube 24 connects the latter universal joints. Center C is the common center of the universal joints that include gimbal ring 38 and link 16, respectively; C' is the common center of the universal joints that include gimbal ring 42 and link 20, respectively. Therefore, links 16 and 20 have a common center line which connects centers C and C'.

The angular deflection in pitch and yaw or, a combination of pitch and yaw, of tube 24 is the same as that of ring 122 because the two universal joints centered at C have the same angular displacement in magnitude and sense of direction. The angular deflection in pitch and yaw, or a combination of pitch and yaw, at the universal joints that are connected to end link 20 is the same as that of the universal joints that include gimbal ring 42.

Because of the equality of deflection in each of the four universal joints, the pitch and yaw rotation of the longitudinal axis of end link 20 relative to the longitudinal axis of the first link and robot arm is exactly twice as large as that of axis C-C' relative to the axis of the first link and robot arm. Furthermore, the direction of the rotation of end link 20 and axis C-C' is the same in the pitch rotational sense, the yaw rotational sense and any combination of pitch and yaw rotations. Axis C-C' and the longitudinal axis of end link 20 always lie in the same plane. Link 20 and any tool attached to it can have large deflections in pitch and yaw directions and combinations of these directions, and the deflections can exceed 90 degrees. When, for example, the angular displacement is 100°, the deflection in each universal joint is only 50°, and there is no gimbal lock or singularity.

Gimbal rings 136 and 140 are free to rotate relative to ring 122 about two parallel axes, the axes P—P and P'—P'. The pitch displacement angles of the universal joints that include first and third gimbal rings 136, 140 are made equal by the pitch equalization mechanism described above. For example, the pitch rotation of gimbal ring 140 relative to axis C–C' is made equal to the pitch rotation of axis C–C' relative to gimbal ring 136 by connecting gimbal ring 136 to gimbal ring 140 through pitch equalization members 80 and 86.

Gimbal rings 38 and 42 are free to rotate relative to tube 24 about two parallel axes, Y—Y and Y'—Y' axes. The yaw displacement angle of the universal joints that include gimbal rings 38 and 42 with respect to the longitudinal axis of tube 24 are made equal to each other by connecting gimbal ring 38 to gimbal ring 42 by means of the yaw equalization members 64 and 66.

When the pitch and yaw equalization members are taut, there is no backlash and the tension in members 80 and 86 will radially preload the bearings between gimbal rings 136, 140 and ring 122, thereby eliminating lost motion due to radial bearing clearance.

Pitch equalizations members 80 and 86 equalize the pitch components of articulation about centers C and C'. The yaw equalization members 64, 66 equalize the yaw components of articulation about centers C and C'. Due to the operation of the pitch and yaw equalization mechanisms, the first link 16 and end link 20 have the relationship of an object and its mirror image with respect to the transverse midplane located equidistant from centers C and C' and perpendicular to axis C–C'. The mechanism that connects link 16 to link 20 is functionally equivalent to a constant velocity coupling connecting links 16 and 20 to a first train of components that include gimbal ring 136, ring 122 and gimbal ring 140 and to a second train of components that include gimbal ring 38, ring 122 and gimbal ring 42. Both of these trains connect link 20 to link 16 and represent redundant restraints. The constant velocity coupling relationship guarantees that the two constraints are compatible with respect to their effects on the displacements produced in links 16 and 20.

Figure 7:
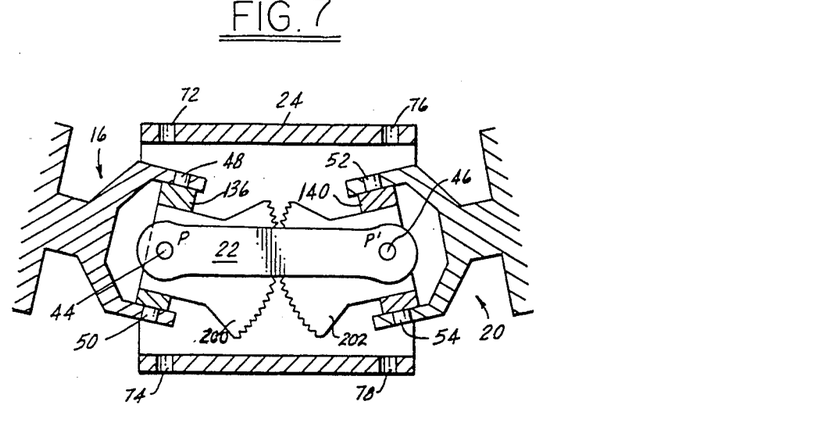
FIG. 7 is a schematic cross section taken at a vertical plane through the first and second centers showing a gear segment formed integrally with each of the inner gimbal rings for producing pitch equalization.

FIG. 7 shows another means for obtaining angular equality of pitch rotation (called pitch equalization) of the first and third gimbal rings about the first and second centers. Here, instead of the two pitch equalization members pinned to the gimbal rings on opposite lateral sides of the longitudinal axis, the gimbal rings are formed integrally with portions of gear wheels 200, 202 during continuous mutual engagement. When gimbal ring 136 rotates clockwise about the first axis, gimbal ring 140 rotates counterclockwise about the second axis through the same angular range as that of gimbal ring 136. Outer gimbal rings 38, 42, which are pinned to the connecting tube, are not shown in FIG. 7 in order to clarify the pitch equalization technique illustrated there.

Figure 8:
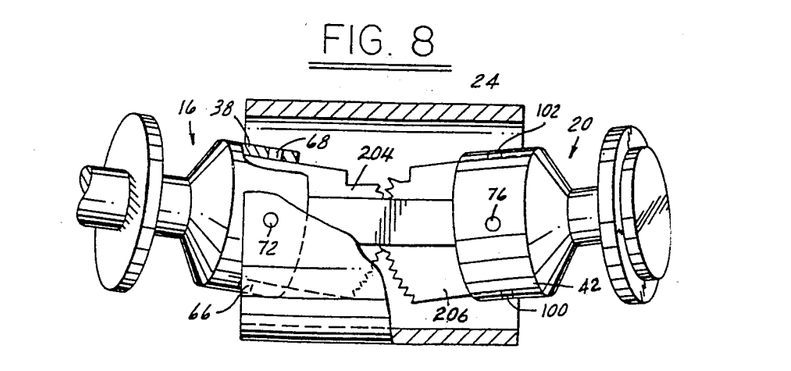
FIG. 8 is a schematic top view of the wrist showing gear segments formed integrally with the outer gimbal rings for producing yaw equalizations.

The yaw equalization can also be effected by the device shown in FIG. 8, which includes a third gear wheel portion 204 fixed to outer gimbal ring 38 and a fourth gear wheel portion 206 fixed to fourth gimbal ring 42 and in continuous meshing engagement with gear wheel 204. When gimbal ring 38 rotates about the Y—Y axis of the first center, gimbal ring 42 rotates in the opposite direction about the Y'—Y' axis at the second center. Gimbal rings 136 and 140 are not shown in FIG. 8 in order to clarify the yaw equalization technique illustrated there.

By coordinating the pitch and yaw actuation of the push-pull rods 26 and 28 and the yaw pull rods 27 and 29, link 20 can be made to rotate in pure rolling or spinning motion about its own axis while it is inclined with respect to the axis of link 16, tube 24 and ring 122. In this case, the mechanism will behave as a constant velocity joint, although it does not require that the axis of the end link 20 be externally supported.

Having described the preferred embodiment of my invention, what I claim is:

1. A hollow non-singular robot wrist comprising:
    a first link;
    an end link spaced axially from the first link;
    a ring connecting the first link and the end link, a first center and a second center spaced apart on the ring, having a hole extending between the first center and the second center;
    a connecting tube;
    first gimbal means for connecting the ring and the first link for rotation about a first pair of substantially perpendicular axes that intersect at the first center, having a hole aligned with the hole of the ring and extending through the first gimbal means;
    second gimbal means concentric with the first center for connecting the tube and the first link for rotation about the first pair of axes;
    third gimbal means for connecting the ring and the end link for rotation about a second pair of substantially perpendicular axes that intersect at the second center having a hole aligned with the hole of the ring and extending through the third gimbal means;
    fourth gimbal means concentric with the second center for connecting the tube and the end link for rotation about the second pair of axes;
    first means for substantially equalizing the amount of rotation of the first link about a first axis of the first pair of axes at the first link to the amount of rotation of the end link about a first axis of the second pair of axes at the second center; and
    second means for substantially equalizing the amount of rotation of the first link about the second axis of the first pair of axis at the first center to the amount of rotation of the end link about the second axis of the second pair of axes at the second center.

2. The device of claim 1 wherein the first equalizing means includes:
    a first gear mounted for rotation about the first axis of the first pair of axes at the first center; and
    a second gear engaged with the first gear, mounted for rotation at the second center about the axis of the second pair of axes that is parallel to said first axis of the first pair of axes.

3. The device of claim 1 wherein the second equalizing means includes:
    a third gear mounted for rotation about the second axis of the first pair of axes at the first center; and
    a fourth gear engaged with the third gear, mounted for rotation at the second center about the axis of the second pair of axes that is parallel to said second axis of the first pair of axes.

4. The device of claim 1 wherein the first equalizing means includes:
    a first gear mounted for rotation about the first axis of the first pair of axes at the first center; and
    a second gear engaged with the first gear, mounted for rotation at the second center about the axis of the second pair of axes that is parallel to said first axis of the first pair of axes;

and wherein the second equalizing means includes:

a third gear mounted for rotation about the second axis of the first pair of axes at the first center; and a fourth gear engaged with the third gear, mounted for rotation at the second center about the axis of the second pair of axes that is parallel to said second axis of the first pair of axes.

5. The device of claim 1 wherein the first equalizing means includes:

a first connecting means having one end attached to the first gimbal means at a position offset from the plane that contains the pitch axis and the axis that connects the centers at the first center, said attachment being located above said plane, and having a second end attached to the third gimbal means at a position offset from the plane that contains the pitch axis and the axis that connects the centers at the second center, said attachment being located below said plane; and a second connecting means having one end attached to the first gimbal means at a position offset from the plane that contains the pitch axis and the axis that connects the centers at the first center, said attachment being located below said plane, and having a second end attached to the third gimbal means at a position offset from the plane that contains the pitch axis and the axis that connects the centers at the second center, said attachment being located above said plane.

6. The device of claim 1 wherein the second equalizing means includes:

a third connecting means having a first end attached to the second gimbal means at a position offset from the plane that contains the axis that connects the centers and the yaw axis at the first center, said attachment being located at a first lateral side of said plane, and having a second end attached to the fourth gimbal means at a position offset from the plane that contains the axis that contains the centers and the yaw axis at the second center, said attachment being located at the opposite lateral side of said plane from the location of the first end; and a fourth connecting means having a first end attached to the second gimbal means at a position offset from the plane that contains the axis that connects the centers and the yaw axis at the first center, said attachment being located at the opposite lateral side of said plane from the location of the first end of the third connecting element, and having a second end attached to the fourth gimbal means at a position offset from the plane that contains the axis that connects the centers and the yaw axis at the second center, said attachment being located at the opposite lateral side of said plane from the location of the first end.

7. The device of claim 1 wherein the first equalizing means includes:

a first connecting means having one end attached to the first gimbal means at a position offset from the plane that contains the pitch axis and the axis that connects the centers at the first center, said attachment being located above said plane, and having a second end attached to the third gimbal means at a position offset from the plane that contains the pitch axis and the axis that connects the centers at the second center, said attachment being located below said plane; and a second connecting means having one end attached to the first gimbal means at a position offset from the plane that contains the pitch axis and the axis that connects the centers at the first center, said attachment being located below said plane, and having a second end attached to the third gimbal means at a position offset from the plane that contains the pitch axis and the axis that connects the centers at the second center, said attachment being located above said plane;

and wherein the second equalizing means includes:

a third connecting means having a first end attached to the second gimbal means at a position offset from the plane that contains the axis that connects the centers and the yaw axis at the first center, said attachment being located at a first lateral side of said plane, and having a second end attached to the fourth gimbal means at a position offset from the plane that contains the axis that contains the centers and the yaw axis at the second center, said attachment being located at the opposite lateral side of said plane from the location of the first end; and a fourth connecting means having a first end attached to the second gimbal means at a position offset from the plane that contains the axis that connects the centers and the yaw axis at the first center, said attachment being located at the opposite lateral side of said plane from the location of the first end of the third connecting element, and having a second end attached to the fourth gimbal means at a position offset from the plane that contains the axis that connects the centers and the yaw axis at the second center, said attachment being located at the opposite lateral side of said plane from the location of the first end.

8. The device of claim 7 wherein the first, second, third and fourth connecting means include chain links at each of their ends near the respective gimbal means to which said connecting means is attached.

9. The device of claim 1 further comprising:

pitch actuating means connected to the first gimbal means for rotating the second gimbal means with respect to the pitch axis at the second center; and yaw actuating means for rotating the first gimbal means with respect to the yaw axis at the first center.

10. The device of claim 1 further including pitch and yaw actuating means which includes:

means connected to the second gimbal means respectively above and below the plane that contains the axis that connects the centers and the pitch axis at the first center for pivoting the second gimbal means about the pitch axis; and means connected to the first gimbal means at respectively opposite sides of the plane that contains the axis that connects the centers and the yaw axis at the first center for pivoting the first gimbal means about the yaw axis.

11. The device of claim 2 further including pitch and yaw actuating means which includes:

means connected to the second gimbal means respectively above and below the plane that contains the axis that connects the centers and the pitch axis at the first center for pivoting the second gimbal means about the pitch axis; and means connected to the first gimbal means at respectively opposite sides of the plane that contains the axis that connects the centers and the yaw axis at the first center for pivoting the first gimbal means about the yaw axis.

12. The device of claim 3 further including pitch and yaw actuating means which includes:
   means connected to the second gimbal means respectively above and below the plane that contains the axis that connects the centers and the pitch axis at the first center for pivoting the second gimbal means about the pitch axis; and
   means connected to the first gimbal means at respectively opposite sides of the plane that contains the axis that connects the centers and the yaw axis at the first center for pivoting the first gimbal means about the yaw axis.

13. The device of claim 4 further including pitch and yaw actuating means which includes:
   means connected to the second gimbal means respectively above and below the plane that contains the axis that connects the centers and the pitch axis at the first center for pivoting the second gimbal means about the pitch axis; and
   means connected to the first gimbal means at respectively opposite sides of the plane that contains the axis that connects the centers and the yaw axis at the first center for pivoting the first gimbal means about the yaw axis.

14. The device of claim 5 further including pitch and yaw actuating means which includes:
   means connected to the second gimbal means respectively above and below the plane that contains the axis that connects the centers and the pitch axis at the first center for pivoting the second gimbal means about the pitch axis; and
   means connected to the first gimbal means at respectively opposite sides of the plane that contains the axis that connects the centers and the yaw axis at the first center for pivoting the first gimbal means about the yaw axis.

15. The device of claim 6 further including pitch and yaw actuating means which includes:
   means connected to the second gimbal means respectively above and below the plane that contains the axis that connects the centers and the pitch axis at the first center for pivoting the second gimbal means about the pitch axis; and
   means connected to the first gimbal means at respectively opposite sides of the plane that contains the axis that connects the centers and the yaw axis at the first center for pivoting the first gimbal means about the yaw axis.

16. The device of claim 7 further including pitch and yaw actuating means which includes:
   means connected to the second gimbal means respectively above and below the plane that contains the axis that connects the centers and the pitch axis at the first center for pivoting the second gimbal means about the pitch axis; and
   means connected to the first gimbal means at respectively opposite sides of the plane that contains the axis that connects the centers and the yaw axis at the first center for pivoting the first gimbal means about the yaw axis.

17. The device of claim 8 further including pitch and yaw actuating means which includes:
   means connected to the second gimbal means respectively above and below the plane that contains the axis that connects the centers and the pitch axis at the first center for pivoting the second gimbal means about the pitch axis; and
   means connected to the first gimbal means at respectively opposite sides of the plane that contains the axis that connects the centers and the yaw axis at the first center for pivoting the first gimbal means about the yaw axis.

18. The device of claim 1 wherein the first gimbal means is a ring connected to the first link for rotation about the yaw axis at the first center and joined to the connecting ring for rotation about the pitch axis at the first center;
   the second gimbal means is a ring concentric with the first center connected to the tube for rotation about the yaw axis at the first center and supported on the first link for rotation about the pitch axis at the first center;
   a third gimbal means is a ring having its center at the second center connected to the end link for rotation abut the yaw axis at the second center and jointed to the connecting ring for rotation about the pitch axis at the second center; and
   the fourth gimbal means is a ring concentric with the second center connected to the tube for rotation about the yaw axis at the second center and supported on the end link for rotation about the pitch axis at the second center.

19. The device of claim 1 wherein the first and second pairs of axes are directed transverse to the longitudinal axis of the wrist.

* * * * *